(12) United States Patent
Chen

(10) Patent No.: US 7,751,101 B2
(45) Date of Patent: Jul. 6, 2010

(54) OPTICAL DEVICE WITH MOVABLE OPTICAL MODULE

(76) Inventor: Shih-Huang Chen, No. 12, Ln. 206, Shinjuang St., HsinChu (TW)

(*) Notice: Subject to any disclaimer, the term of this patent is extended or adjusted under 35 U.S.C. 154(b) by 0 days.

(21) Appl. No.: 11/869,559

(22) Filed: Oct. 9, 2007

(65) Prior Publication Data

US 2008/0084588 A1 Apr. 10, 2008

Related U.S. Application Data

(63) Continuation of application No. 10/425,872, filed on Apr. 30, 2003, now Pat. No. 7,298,530.

(30) Foreign Application Priority Data

Dec. 31, 2002 (TW) .............................. 91138175 A

(51) Int. Cl.
*H04N 1/04* (2006.01)
(52) U.S. Cl. ...................... 358/497; 358/474; 358/482; 358/483
(58) Field of Classification Search ................. 358/497, 358/474, 482, 483, 494, 487, 506, 512–514, 358/505, 475, 509; 250/208.1, 239, 234–236, 250/216; 399/211, 212; 382/312, 318, 319
See application file for complete search history.

(56) References Cited

U.S. PATENT DOCUMENTS 7,298,530 B2* 11/2007 Chen .......................... 358/497

* cited by examiner

*Primary Examiner*—Cheukfan Lee
(74) *Attorney, Agent, or Firm*—Stolowitz Ford Cowger LLP

(57) ABSTRACT

An optical module with movable reflective mirrors is provided in the invention. The optical module, which is set in a scanner for the scanning of documents, comprises the following elements: a first carriage comprising a first reflective mirror, a lens and a photoelectric sensing device, wherein the first carriage moves along the scanning direction to scan the document to be scanned; a second carriage comprising a second reflective mirror, a lens and a photoelectric sensing device, wherein the second carriage can make relative movement corresponding to the first carriage along the scanning direction; and a third carriage comprising a third reflective mirror, a lens and an photoelectric sensing device, wherein the third carriage can make relative movement corresponding to the first carriage along the scanning direction. Of which, the first carriage is situated between the second carriage and the third carriage with the distance between the second carriage and the third carriage being fixed at a constant value during the course of scanning, while the image light of the document to be scanned forms an image on the photoelectric sensing device via the focusing of the lens after having been reflected via the first reflective mirror, the second reflective mirror, and the third reflective mirror sequentially.

25 Claims, 4 Drawing Sheets

BACKGROUND

OPTICAL DEVICE WITH MOVABLE OPTICAL MODULE

This application is a continuation of U.S. patent application Ser. No. 10/425,872, filed Apr. 30, 2003, entitled OPTICAL MODULE WITH MOVABLE CARRIAGE HAVING MIRROR, the disclosure of which is incorporated herein in its entirety by reference, which claims the benefit of Taiwan application Serial No. 91138175, filed Dec. 31, 2002.

BACKGROUND OF THE INVENTION

1. Field of the Invention

The invention relates in general to an optical module, and more particularly, to an optical module with movable reflective mirrors.

2. Description of the Related Art

Of the many peripherals of a personal computer, the scanner can be said to be essential equipment. Generally speaking, the scanners in today's market have only little difference in terms of function and image scanning quality. Therefore, how to further shrink the size and volume of a scanner to improve the convenience of use has become a focus for R&D engineers in the field of scanners.

Please refer to FIG. 1, a schematic diagram for a conventional optical module. The conventional optical module 100 comprises a carriage 110 and a guiding piece 120, wherein the carriage 110 is equipped with a reflective mirror set, a lens and a photoelectric sensing device (not shown in the diagram).

The carriage 110, which is coupled to the guiding piece 120, can move back and forth along the scan direction D.

In the course of scanning, the image light 130 of the document to be scanned, the reflecting light or the penetrating light of the document to be scanned for instance, enters into the carriage 110. The image light 130, reflected by the reflective mirror set composed of plural reflective mirrors, will be focused via a lens and received by the photoelectric sensing device.

Each reflective mirror of the reflective mirror set, the lens and the photoelectric sensing device are all fixed in the component 110. The purpose is to keep both the front optical path and the rear optical path at a fixed value such that a clear and quality scan image can be obtained. The front optical path is the path traveled by the image light, emitted by the document to be scanned, reflected via various reflective mirrors, arriving at the lens lastly. The rear optical path refers to the path from the lens to the photoelectric sensing device. The component 10, having to accommodate all reflective mirrors, the lens and the photoelectric sensing device, is undesirably large.

It can be understood from the above disclosure that an over-sized component 110 will affect the scanner, which the component 110 is installed therein. The consequence is that the overall volume of the scanner cannot be effectively reduced. Moreover, a conventional scanning module whose back focus cannot be enlarged cannot be used to scan large-sized documents.

SUMMARY OF THE INVENTION

It is therefore an object of the invention to provide an optical module with movable reflective mirrors. The purpose is to effectively reduce the overall volume of a scanner, availing the convenience of use and the scanning of lager-sized documents.

According to the above object, an optical module with movable reflective mirrors is provided in the present invention. The optical module, which is set in a scanner for the scanning of documents, comprises the following elements: a first carriage comprising a first reflective mirror, a lens and a photoelectric sensing device, wherein the first carriage moves along the scanning direction to scan the document to be scanned; a second carriage comprising a second reflective mirror, a lens and a photoelectric sensing device, wherein the second carriage can make relative movement corresponding to the first carriage along the scanning direction; and a third carriage comprising a third reflective mirror, a lens and an photoelectric sensing device, wherein the third carriage can make relative movement corresponding to the first carriage along the scanning direction. Of which, the first carriage is situated between the second carriage and the third carriage with the distance between the second carriage and the third carriage being fixed at a constant value during the course of scanning, while the image light of the document to be scanned forms an image on the photoelectric sensing device via the focusing of the lens after having been reflected via the first reflective mirror, the second reflective mirror, and the third reflective mirror sequentially.

Other objects, features, and advantages of the invention will become apparent from the following detailed description of the preferred but non-limiting embodiments. The following description is made with reference to the accompanying drawings.

DETAILED DESCRIPTION OF THE INVENTION

The optical module with movable reflective mirrors according to the present invention differs with a conventional optical module in that the former has three carriages while the latter has only one single but bigger carriage. The optical module according to the invention reduces the volume of the scanner in which the carriage is accommodated. Without increasing the volume of the carriage on which a lens and a photoelectric sensing device are installed, a reflective mirror is installed between the lens and the photoelectric sensing device to increase the back focus so the scanner can scan larger documents via such optical module.

Figure 1:
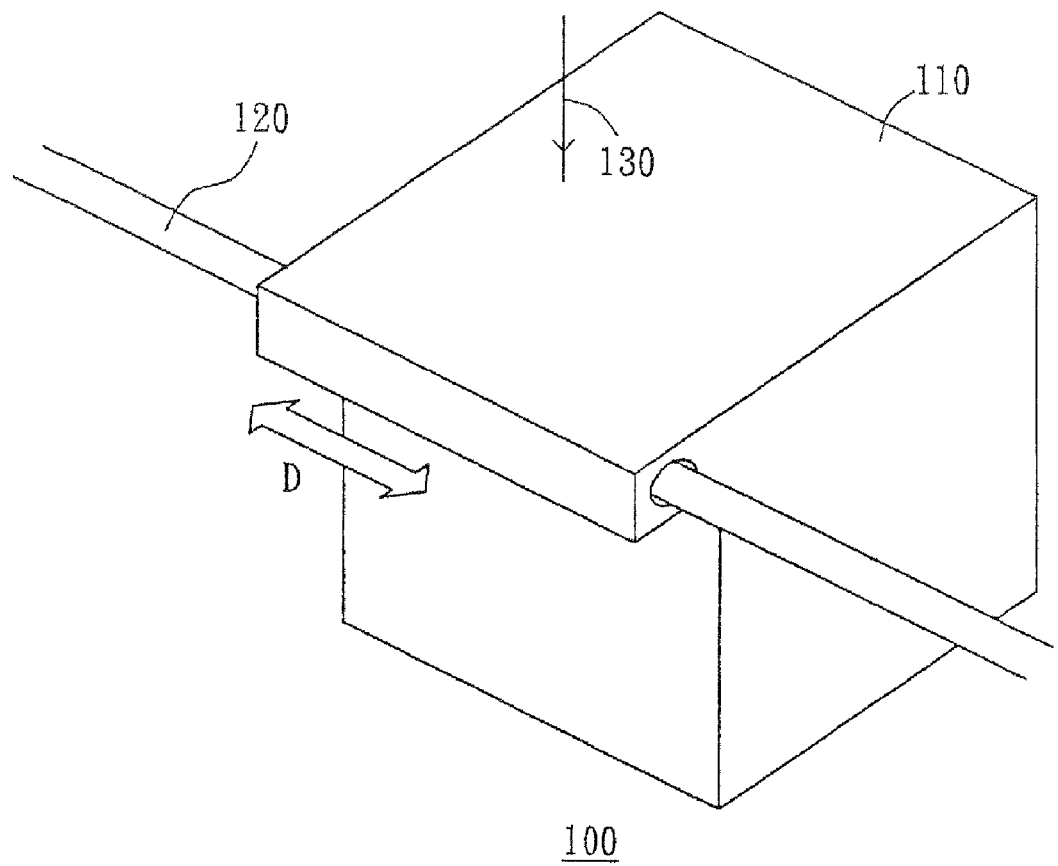
FIG. 1 shows a schematic diagram for a conventional optical module.
Figure 2A:
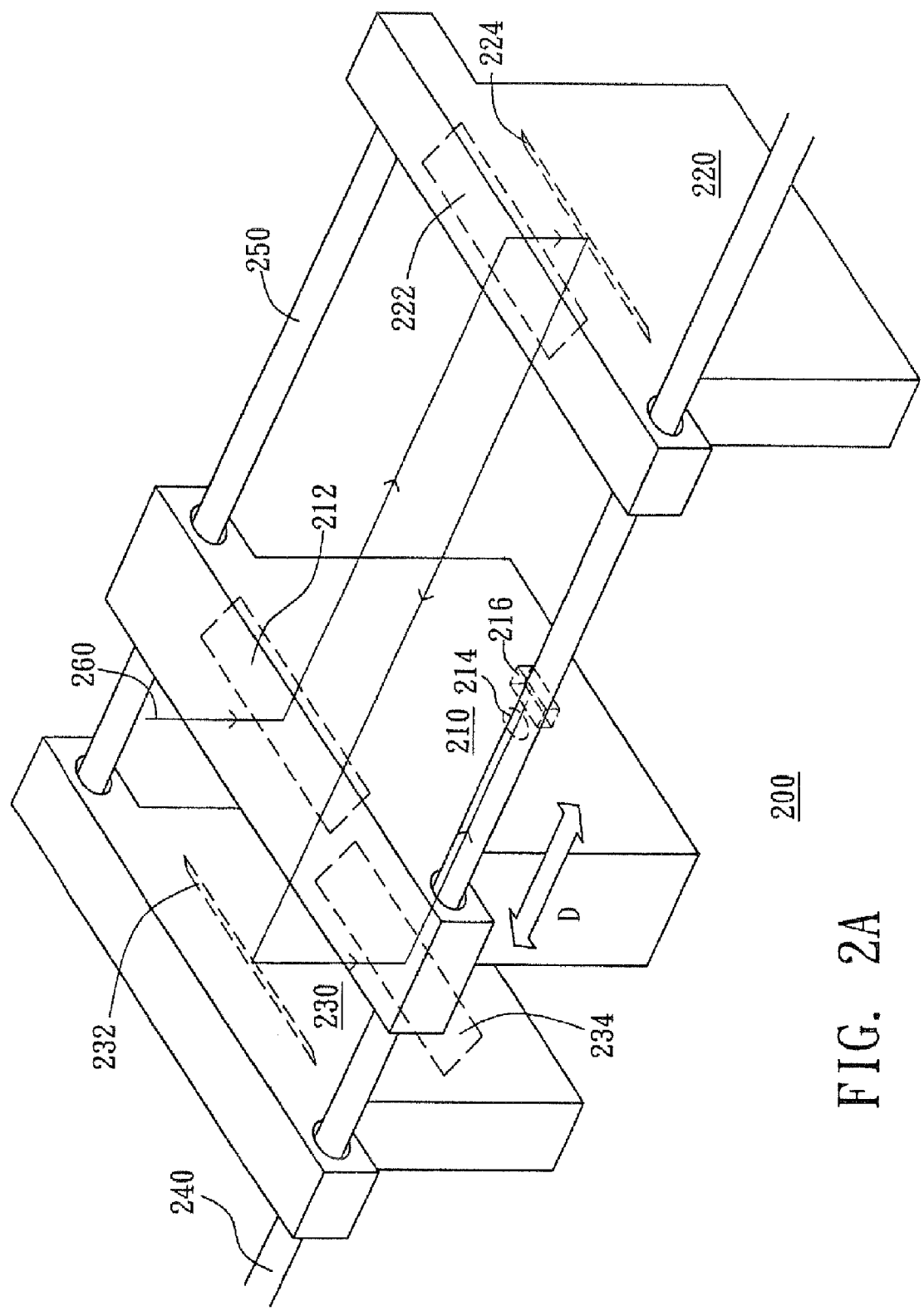
FIG. 2A shows a structural diagram for an optical module with movable reflective mirrors according to the preferred embodiment of the invention.
Figure 2B:
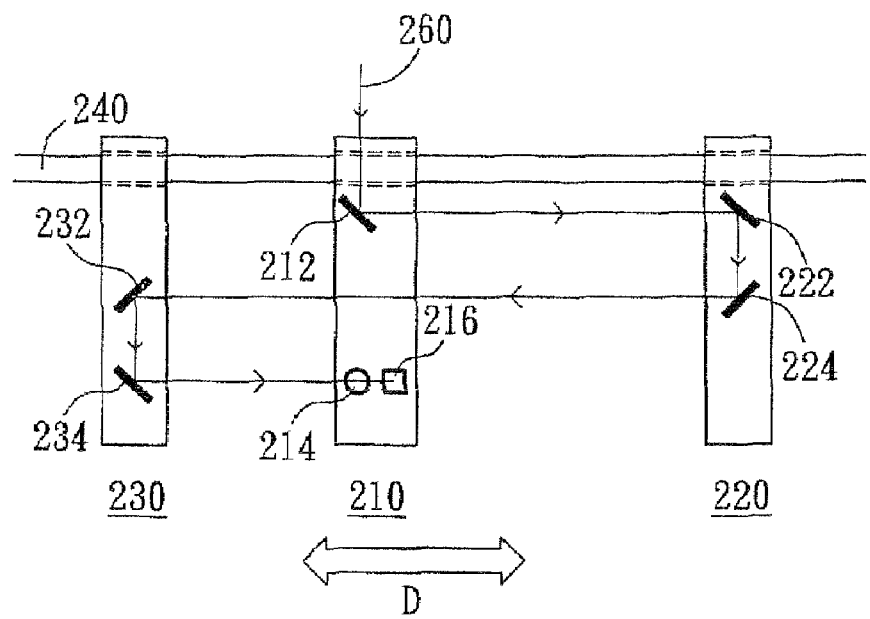
FIG. 2B is a side view for FIG. 2A.

Please refer to FIG. 2A, a structural diagram for an optical module with movable reflective mirrors according to the preferred embodiment of the invention, and FIG. 2B, a side view thereof. The optical module 200, which can be set in a scanner for the scanning of documents to be scanned, comprises carriages 210, 220 and 230, a guiding piece and a firmware 250.

The carriage 210 comprises a reflective mirror 212, a lens 214 and a photoelectric sensing device 216, wherein the carriage 210, being coupled to the guiding piece 240, moves on the guiding piece 240 along the scanning direction D (the pivotal direction of the guiding piece 214) to scan documents.

The carriage 220 comprises reflective mirrors 222 and 224, wherein the carriage 220, being coupled to the guiding piece 240, makes relative movement corresponding to the carriage 210 and moves on the guiding piece 240 along the scanning direction D.

By the same analogy, the carriage 230, coupled to the guiding piece 240, comprises two reflective mirrors 232 and 234, makes relative movement corresponding to the carriage 210 and moves on the guiding piece 240 along the scanning direction D.

As illustrated in FIG. 2A and FIG. 2B, the image light of the document to be scanned is reflected via reflective mirrors 212, 222, 224, 232 and 234 sequentially then forms an image on the photoelectric sensing device via the focusing of the lens 214.

The image light 260 follows an optical characteristic of keeping the front light path unchanged, i.e., the sum of the distance between reflective mirrors 222 and 212, the distance between reflective mirrors 232 and 224, and the distance between the lens 214 and the reflective mirror 234 must be kept at a fixed value. The purpose of keeping the front light path of the image light 260 unchanged can be achieved by installing the carriage 210 between carriages 220 and 230, meanwhile, keeping the distance between carriages 220 and 230 at a fixed value during the course of scanning. A fixed distance between carriages 220 and 230 can be achieved by connecting the firmware 250 between them. As shown in the diagram, the firmware 250, passing through the carriage 210, connects carriages 220 and 230. While the carriage 210 can make relative movement corresponding to carriages 220 and 230 on the firmware 250, carriages 220 and 230 can not make relative displacement due to the connection of the firmware 250 during the course of scanning.

Figures 3A, 3B:
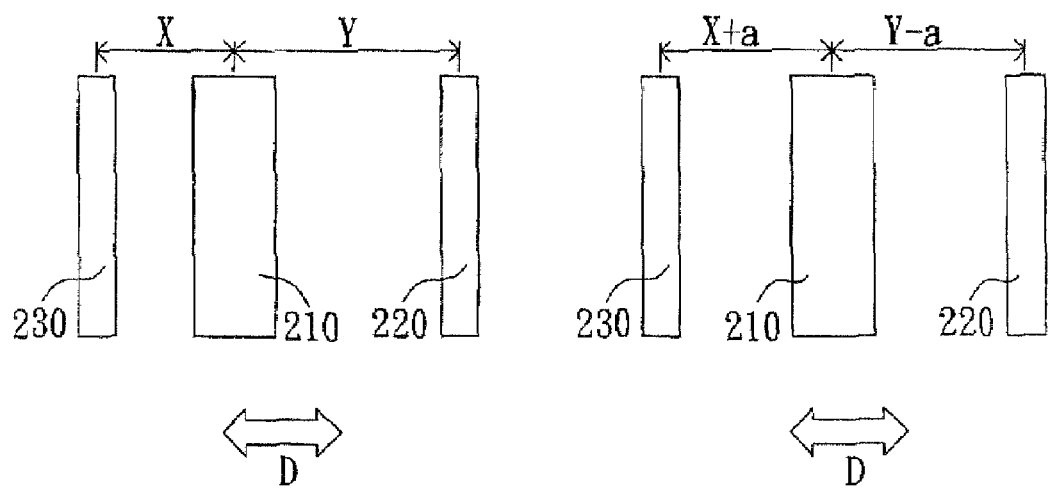
FIG. 3A is a schematic diagram illustrating relative positions between each carriage corresponding to the optical module according to the invention of FIG. 2 during scanning process one.
FIG. 3B is a schematic diagram illustrating relative positions between each carriage corresponding to the optical module according to the invention of FIG. 2 during scanning process two.

Please refer to FIG. 3A and FIG. 3B, schematic diagrams illustrating relative positions between each carriage corresponding to the optical module according to the invention of FIG. 2 during scanning processes. As is shown in the diagrams, all carriages 210, 220 and 230 can move back and forth along the scanning direction D during the course of scanning. The carriage 220 and the carriage 230 always remain a distance of X+Y, which can be achieved by means of the firmware 250 of FIG. 2. When the distance between carriages 210 and 230 is increased from X to X+a (from FIG. 3A to FIG. 3B), the distance between carriages 10 and 220 will be reduced from Y to Y−a (from FIG. 3A to FIG. 3B).

Figure 4:
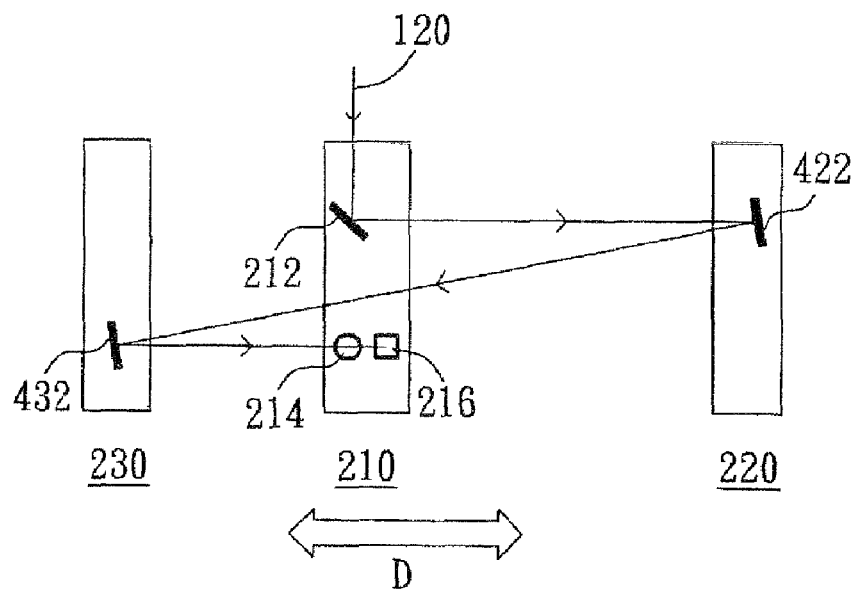
FIG. 4 shows a side view for another reflective mirror layout of the optical module with reflective mirrors according to the preferred embodiment of the invention.

Please refer to both FIG. 2 and FIG. 4, a side view for another reflective mirror layout of the optical module with reflective mirrors according to the preferred embodiment of the invention. Under the circumstance of keeping the front optical path unchanged, the original two-piece designed reflective mirrors 222 and 224 of the carriage 220 can be replaced by a single piece reflective mirror 422 while the original two-piece designed reflective mirrors 232 and 234 of the carriage 230 can be replaced by a single piece reflective mirror 432. Such layout of reflective mirrors reduces not only the number of reflective mirrors but also the volume of the carriage in which the reflective mirrors are installed.

Figure 5A:
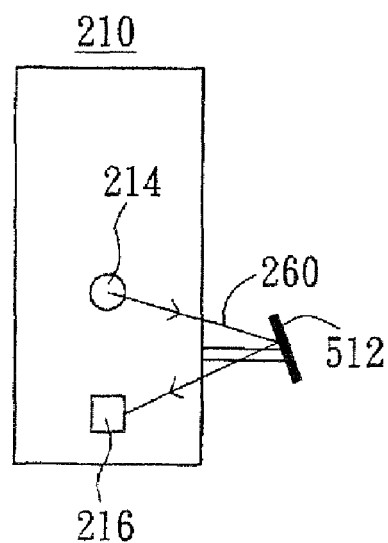
FIG. 5A is a structural diagram for the optical module with reflective mirrors according to the preferred embodiment of the invention when back focus is large.
Figure 5B:
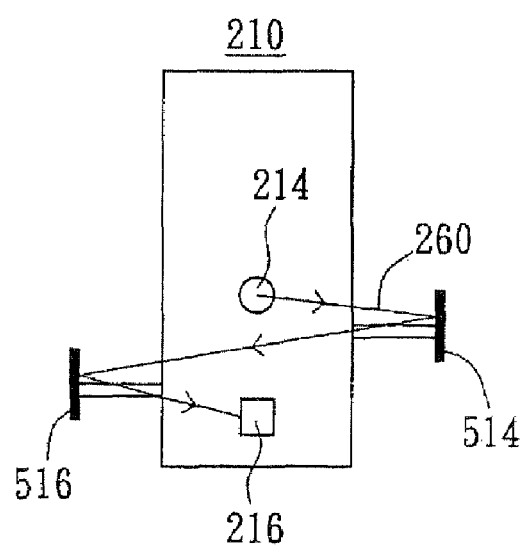
FIG. 5B is another structural diagram for the optical module with reflective mirrors according to the preferred embodiment of the invention when back focus is large.

Please refer to FIG. 5A and FIG. 5B, two structural diagrams for the optical module with reflective mirrors according to the preferred embodiment of the invention when back focus is large. Normally, when a larger document is to be scanned, a larger back focus is needed. That is to say, the distance between the lens and the photoelectric sensing device needs to be enlarged. This can be achieved by means of the structure shown in FIG. 5A and FIG. 5B.

Under the circumstance of not increasing the volume of the carriage 210, the locations for the lens 214 and the photoelectric sensing device 216 can be adjusted with an additional reflective mirror 512 being installed on the carriage 210 as is illustrated in FIG. 5A. Another design as is shown in FIG. 5B is to install reflective mirrors 514 and 516 on the two lateral sides of the carriage 210 respectively to reflect the image light 260, which has been focused via the lens 216, onto the photoelectric sensing device 216. So the back focus can be effectively enlarged permitting the scanning of larger documents.

In the above disclosure, the scanner can be a reflection-type image scanner or a penetration-type image scanner; the guiding piece 240 can be a pivotal shaft or any other elements which enable the component to move back and forth along the scanning direction D; the firmware 250 can be any element, which, connecting components 220 and 230, prevents relative displacement between components 220 and 230 without impeding the movement of the carnage 210 between components 220 and 230; the photoelectric sensing device can be a charged coupled device (CCD) or a complementary metal oxide semiconductor sensor (CMOS sensor).

When compared with a conventional optical module having only one large carriage, the scanning direction of the carriage 210 according to the invention needs only a thinner thickness because a number of reflective mirrors have been moved to carriages 220 and 230. Being equipped with reflective mirrors only, the thickness for carriages 220 and 230 can also be reduced. When compared with the carriage in a conventional optical module, all the carriages in FIG. 2B are shorter in terms of the height while the carriages in FIG. 4 can be even shorter. With the installation of reflective mirrors on the carriage 210, the back focus can be enlarged enabling the scanning of larger documents.

The optical module with movable reflective mirrors according to the preferred embodiment of the invention is featured by the advantages of effectively reducing the volume of the scanner in which the optical module is installed, enhancing the convenience of use and enabling the scanning of larger documents.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical device for scanning an image, the optical device comprising:
   a first reflective surface;
   a second reflective surface fixed relative to the first reflective surface during the scanning; and
   a movable component positioned between the first and second reflective surfaces and having a third reflective surface, wherein the movable component is configured to move relative to the first and second reflective surfaces, and wherein the relative movement is along a line;

wherein the movable component and the reflective surfaces are positionable so that light representing the image is focused onto a sensing device after having been reflected via the first reflective surface, the second reflective surface, and the third reflective surface.

2. The optical device of claim 1, further comprising a guiding piece, wherein the movable component, a structure supporting the first reflective surface, and a structure supporting the second reflective surface are individually coupled to the guiding piece and are each configured to make movement on the guiding piece.

3. The optical device of claim 1, further comprising a firmware, wherein the firmware is used to connect a structure supporting the first reflective surface and a structure supporting the second reflective surface and keep the distance between the two structures at a fixed value during the scanning.

4. The optical device of claim 1, further comprising a fourth reflective surface, wherein the fourth reflective surface is installed on the movable component and is configured to reflect the focused light onto the sensing device.

5. The optical device of claim 4, further comprising a fifth reflective surface and a sixth reflective surface, wherein the fifth reflective surface and the sixth reflective surface are respectively installed on two lateral sides of the movable component and are configured to reflect the focused light onto the sensing device.

6. The optical device of claim 1, wherein the sensing device is a charge coupled device (CCD).

7. The optical device of claim 1, wherein the movable component is configured to move relative to the first and second reflective surfaces and along a scanning direction.

8. An apparatus for scanning an image, said apparatus comprising:
   means for positioning first and second reflective components relative to each other so that a distance between the first and second reflective components is fixed at a constant value during the scanning;
   means for moving a third reflective component between the first and second reflective components and along a line, wherein the movement causes distances between the third reflective component and the other reflective components to change; and
   means for focusing light representing the image onto a sensing device, wherein the light is focused on the sensing device after being reflected by the first, second, and third reflective components.

9. The apparatus of claim 8, wherein the light is reflected by the third reflective component before being sequentially reflected by the first and second reflective components.

10. The apparatus of claim 8, further comprising means for guiding movement of the first and second reflective components relative to the apparatus.

11. The apparatus of claim 8, further comprising means for keeping an additional reflective component fixed relative to the first and second reflective components during the scanning.

12. The apparatus of claim 8, further comprising means for attaching an additional reflective component to the moving means, wherein the additional component is configured to reflect the focused light onto the sensing device.

13. The apparatus of claim 8, wherein the focusing means and the sensing device are both attached to the moving means.

14. The apparatus of claim 8, wherein movement of the third reflective surface is along a scanning direction.

15. An apparatus for scanning an image, the apparatus comprising:
   a first reflective surface; and
   a movable component configured to move relative to the first reflective surface, wherein relative movement is along a line, and wherein the movable component has attached thereto a second reflective surface and a lens or a light sensor;
   wherein the movable component and the reflective surfaces are positionable so that light representing the image is focused onto a sensing device after having been reflected using the reflective surfaces.

16. The apparatus of claim 15, further comprising an additional reflective surface located along a light path of the light, wherein the additional reflective surface is attached to the movable component and fixed relative to the second reflective surface during the scanning.

17. The apparatus of claim 15, further comprising an additional reflective surface located along a light path of the light, wherein the additional reflective surface is fixed relative to the first reflective surface during the scanning.

18. The apparatus of claim 15, further comprising a rod configured to restrict movement of the first reflective surface relative to a third reflective surface during the scanning, wherein the rod is configured to guide movement of the movable component.

19. The apparatus of claim 15, wherein the movable component is configured to move prior to scanning.

20. The apparatus of claim 15, wherein the movable component is configured to move prior to scanning and then remain in a fixed position relative to the reflective surfaces during the scanning.

21. An apparatus for scanning an image, the apparatus comprising:
   means for supporting a first reflective surface; and
   means for moving an optical module relative to the first reflective surface, wherein the optical module has coupled thereto a second reflective surface and a light-focusing component;
   wherein the optical module and the reflective surfaces are positionable so that light representing the image is focused onto a sensing device after having been reflected using the reflective surfaces.

22. The apparatus of claim 21, wherein the moving means moves relative to the apparatus.

23. The apparatus of claim 22, wherein the sensing device is coupled to the optical module and moves in correspondence with movement of the optical module.

24. The apparatus of claim 21, wherein prior to being focused onto the sensing device, the light is reflected by the second reflective surface before being reflected by the first reflected surface.

25. The apparatus of claim 21, wherein the second reflective surface and the light-focusing component are coupled to the optical module and remain fixed relative to each other during the scanning.

* * * * *